(12) United States Patent
Banister

(10) Patent No.: US 6,169,752 B1
(45) Date of Patent: Jan. 2, 2001

(54) METHOD AND SYSTEM FOR PREVENTING INFORMATION LOSSES DURING ALTERNATIVE FREQUENCY SEARCHES

(75) Inventor: Brian C. Banister, San Diego, CA (US)

(73) Assignee: LSI Logic Corporation, Milpitas, CA (US)

( * ) Notice: Under 35 U.S.C. 154(b), the term of this patent shall be extended for 0 days.

(21) Appl. No.: 09/031,078

(22) Filed: Feb. 26, 1998

(51) Int. Cl.[7] ........................................ H04J 3/07
(52) U.S. Cl. ........................ 370/506; 370/331; 375/340
(58) Field of Search ................................. 370/328, 329, 370/331, 332, 333, 498, 505, 506, 503, 354; 375/363, 340

(56) References Cited

U.S. PATENT DOCUMENTS

| | | | |
|---|---|---|---|
| 4,476,581 | * 10/1984 | Bragas | 455/166.1 |
| 5,625,876 | * 4/1997 | Gilhousen et al. | 370/331 |
| 5,764,687 | * 6/1998 | Easton | 375/206 |
| 5,883,888 | * 3/1999 | St-Pierre | 370/331 |
| 6,005,855 | * 12/1999 | Zehavi et al. | 370/335 |
| 6,038,263 | * 3/2000 | Kotzin et al. | 375/299 |

* cited by examiner

*Primary Examiner*—Ajit Patel
*Assistant Examiner*—Saba Tsegaye
(74) *Attorney, Agent, or Firm*—Mitchell, Silberberg & Knupp LLP

(57) ABSTRACT

A method and system for preventing information losses during alternative frequency searches by a receiving unit in a communication system in which data is channel coded, interleaved, and segmented into a plurality of frames. The method comprises the steps of discontinuing demodulation at a predetermined time before a frame ends, inserting zero values into the frame, and performing a search for alternative frequencies while continuing to insert zero values into the frame and then a next frame. After the search is completed, insertion of zero values is discontinued and demodulation is resumed. In one preferred version, the receiving unit comprises a mobile radio station operating at a serving frequency. The step of inserting zero values is followed by a step of programming the mobile radio station to a search frequency and waiting for the mobile radio station to settle. The step of discontinuing insertion of zero values is preceded by a step of programming the mobile radio station to the serving frequency and waiting for the mobile radio station to settle.

19 Claims, 2 Drawing Sheets

METHOD AND SYSTEM FOR PREVENTING INFORMATION LOSSES DURING ALTERNATIVE FREQUENCY SEARCHES

BACKGROUND OF THE INVENTION

1. Field of the Invention

This invention relates to the field of electronic communications, in particular a method and system for preventing information losses during alternative frequency searches.

2. Description of the Related Art

Cellular systems rely on "handoffs" to maintain call continuity. When a mobile station, for example a hand held cellular phone, moves away from the serving base station, the call is transferred, or "handed off,"to a new and closer base station. In this way a call is minimally disrupted by the movement of the mobile station. In general, digital cellular systems require the mobile station to aid the base station in making handoff decisions by reporting the strength at which the mobile receives signals from alternative base stations.

In direct sequence Code Division Multiple Access (CDMA) systems, many base stations and radio signals share the same band of the frequency spectrum; different users and base stations are distinguished by the use of uniquely identifying "spreading codes," which allow a user to separate its desired signal from the undesired interference of other users. It is easy for a mobile station in this system to simultaneously receive data from the serving base station and to measure the power of an alternative base station without changing the radio frequency. However, sometimes it is required that the mobile search alternative frequencies, making continued data reception impossible. Since there are generally no dead times in the transmission of data in CDMA systems, this results in the loss of some information.

The conventional, direct approach to such alternative frequency searches is to perform the following process steps:

1. At the beginning of a data frame, stop demodulation.
2. Tune to the search frequency.
3. Perform a search.
4. Retune to the serving frequency.
5. Begin demodulation at the next frame.

This entails the loss ("nulling out") of some integer number of frames of data. For a cellular phone being used for a voice conversation, this loss results in a degradation of audio quality. In particular, the user may hear clicks or nulled voice or other undesired noises.

Therefore, an object of this invention is to perform alternative frequency searches without losing any frames of data (information).

SUMMARY OF THE INVENTION

This object is achieved by the present invention, which comprises a method for preventing information losses during alternative frequency searches by a receiving unit in a communication system, wherein data is channel coded, interleaved, and segmented into a plurality of frames. The method comprises the steps of discontinuing demodulation at a predetermined time before a frame ends, inserting zero values into the frame, and performing a search for alternative frequencies while continuing to insert zero values into the frame and then a next frame. After the search is completed, insertion of zero values is discontinued and demodulation is resumed.

As a result of this novel procedure, the present invention allows searching of frequencies other than a serving frequency without necessarily losing any data. This applies to any systems where alternate frequencies must be searched but there are no free times provided to do so. As compared to conventional methods which require a "hard" degradation from throwing away complete frames of data (i.e. information will certainly be lost), the present invention only results in "soft" degradation (effective loss of signal power without a certain loss of information).

In one preferred embodiment of the present invention, the receiving unit comprises a mobile radio station operating at a serving frequency. The step of inserting zero values is followed by a step of programming the mobile radio station to a search frequency and waiting for the mobile radio station to settle. The step of discontinuing insertion of zero values is preceded by a step of programming the mobile radio station to the serving frequency and waiting for the mobile radio station to settle.

A preferred version of a system or integrated circuit embodying the present invention includes a demodulator which discontinues demodulation at a predetermined time before a frame ends, a deinterleaver which deinterleaves data received from the demodulator, and a channel decoder which decodes data received from the deinterleaver. There is also a control processor which directs zero values to be inserted into the frame after demodulation is discontinued, and a search unit which is directed to perform a search for alternative frequencies by the control processor, which continues to insert zero values into the frame and then a next frame. The control processor discontinues insertion of zero values after the search is completed, and then allows the demodulator to resume demodulation.

These and other aspects, features, and advantages of the present invention will be apparent to those persons having ordinary skill in the art to which the present invention relates from the foregoing description and the accompanying drawings.

DESCRIPTION OF THE PREFERRED EMBODIMENTS

A. Channel Coding Techniques

Figures 1, 2:
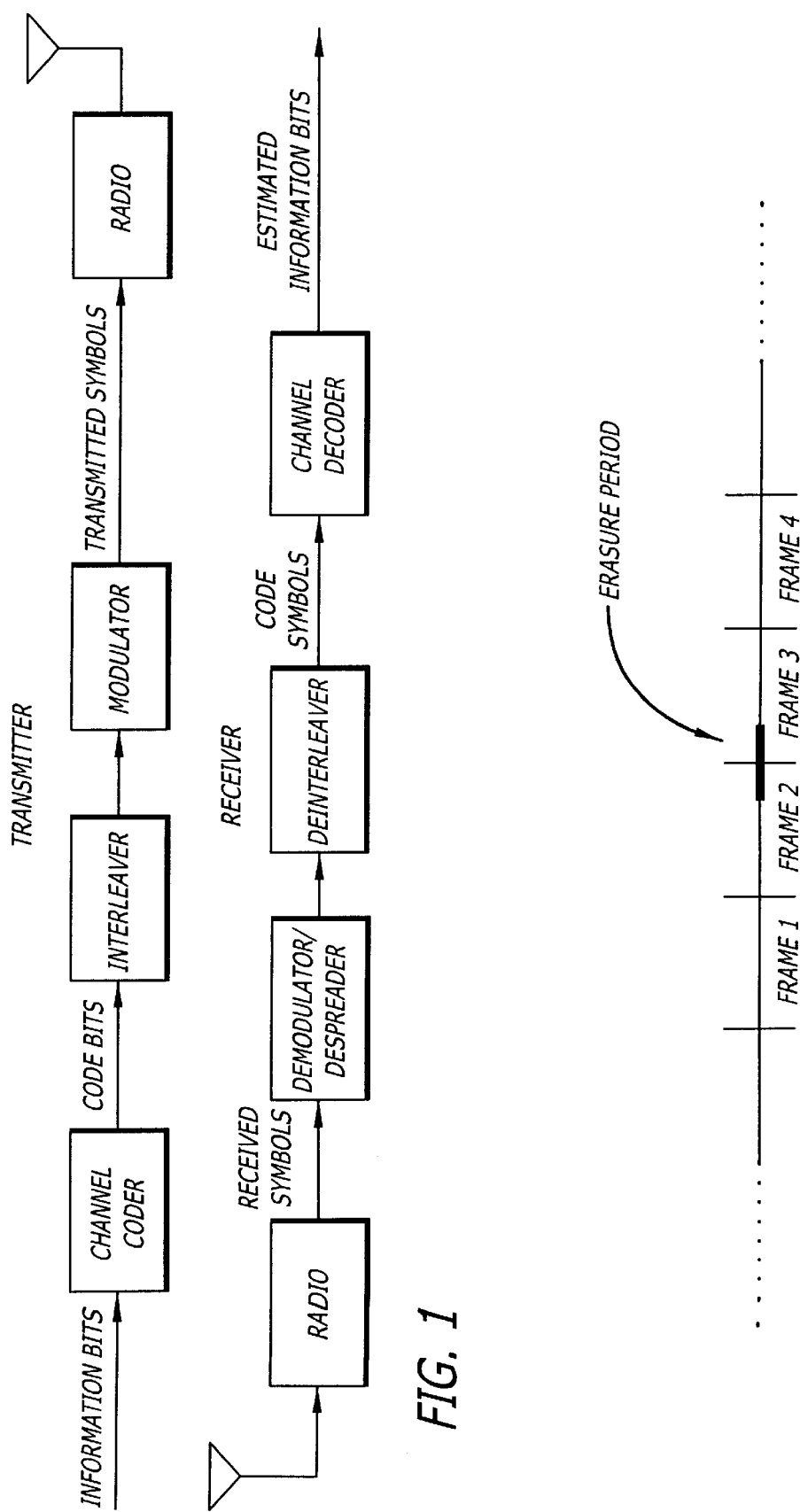
FIG. 1 is a block diagram of typical wireless channel modulation.
FIG. 2 is a diagram showing an erasure period in a sequence of frames.

A number of coding techniques are applied in digital cellular communications to minimize the error rate for a given data rate subject to certain channel constraints, such as signal bandwidth and transmitter power. One group of techniques is commonly termed "forward error correction coding" or "channel coding". These names refer to the fact that such codes allow for the correction of erroneous channel reception. For each digital bit of information, these codes generate some greater amount of "coded" bits.

The "rate" of a code refers to the number of coded bits generated from a number of information bits. For example, if 40 information bits generate 80 coded bits, then the rate or the code is said to be ½. The simplest form of channel coding is repetition coding, wherein the coded bit stream with rate 1/N is generated by simply repeating each bit N times. By way of example and not of limitation, a repetition code is used here only for purposes of illustrating the invention. There are many much more effective codes which can be used with the present invention, such as various convolutional and block codes and other codes well-known to those skilled in the art.

An example of using rate ⅓ repetition coding on information bits is:

| information bits: | 1 0 1 0 1 1 1 0 . . . |
|---|---|
| rate 1/3 code bits: | 111000111000111111111000 . . . |

The most simple modulation scheme would modulate the code bits as positive or negative code symbols. Generally, a digital 1 maps to an analog −1 and a digital 0 maps to an analog +1. The digital 0's and 1's are referred to as "bits," while the analog −1's and +1's are called "symbols." Thus, the modulation symbols from the above code bit sequence, shown with a symbol count below, are:

| symb | −1 | −1 | −1 | +1 | +1 | +1 | −1 | −1 | −1 | +1 | +1 | +1 | −1 | −1 | −1 | −1 | −1 | −1 | −1 | −1 | −1 | +1 | +1 | +1 |
|---|---|---|---|---|---|---|---|---|---|---|---|---|---|---|---|---|---|---|---|---|---|---|---|---|
| count | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

Demodulation is performed by simply adding the received values of all the symbols corresponding to a given bit; if the result is greater than zero, then the bit is decided as a 0, while if the result is less than zero, the bit is decided as a 1. For example, the first bit is calculated by adding symbols 1, 2 and 3. In the absence of any channel degradation, adding these symbols gives −1−1−1=−3,which is decided as a digital 1.

A coding technique of importance to the present invention is interleaving, which takes a "frame" of code bits and reshuffles the order prior to actual transmission over the channel. A burst of errors over the channel is unlikely to make successful reception of an interleaved frame impossible. After interleaving, the code symbols corresponding to each information bit are no longer adjacent. Thus, a burst of channel errors will not necessarily affect all of the code symbols for a given information bit.

Considering the 24 code bit example of code repetition above, the interleaver pattern may, for example, be:

1 6 11 16 21 4 9 14 19 24 3 8 13 18 23 5 10 15 20 2 7 12 17 22

Thus, the first code symbol is transmitted first, followed by the sixth code symbol, then the eleventh code symbol, etc.

When combined with repetition or other forms of channel coding, interleaving provides resilience to "fading," a channel degradation common in mobile wireless environments. Fading is the temporary nulling out of the signal due to the self-interference of multiple radio path reflections. That is, the faded symbols will appear as 0 rather than +1 or −1, and thus not affect the outcome. For example, if the last five symbols transmitted in the frame were "faded", then the code symbols 2, 7, 12, 17, and 22 would be received as zeros. Note that these correspond to the original first, second, fourth, fifth and sixth bits, but there remain other code symbols, unfaded, which may be used to determine the value of each of these bits. For example, code symbols 1 and 3 are not faded and can be used to determine the first information bit. In the above example with symbol 2 faded, the first bit would be found using the sum of symbols 1, 2 and 3 to give −1+0−1=−2=digital 0; there is no error from the fade. Note that in the presence of noise, all three symbols contribute noise terms, and there is a signal to noise degradation from the loss of the faded symbol.

As is shown in FIG. 1, the decoding process for received symbols is usually divided into a deinterleaver and a decoder. The deinterleaver undoes the interleaving process. The decoder is designed to decode the received signal as though the interleaving/deinterleaving never occurred; if successful, it undoes the channel coding.

B. The "Erasure"Procedure of the Present Invention

The method of the present invention performs its alternative frequency search in such a way that the fade resistant capabilities of forward error correction coding and interleaving can be used to allow successful decoding without information losses. The alternative frequency search is timed such that one or two frames have "erasures" due to the search, but neither frame is completely lost. Erasures are the intentional insertion of zeros as received symbols after the control processor (CP) of a mobile station decides to perform an alternative frequency search. Thus, the symbols transmitted during the time in which the mobile station is off the serving frequency do not contribute to the demodulation summation described above. Since the erasure zeros are inserted after any noise source, there is no noise contribution from erased symbols. This process is illustrated in FIG. 2.

Figure 3:
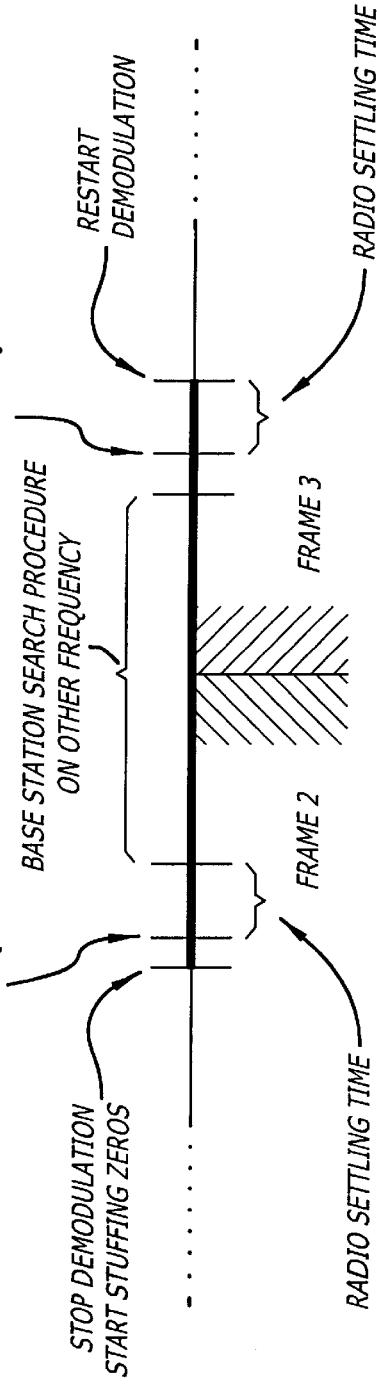
FIG. 3 is a diagram showing how the method steps of the present invention are performed during an erasure period.
Figure 4:
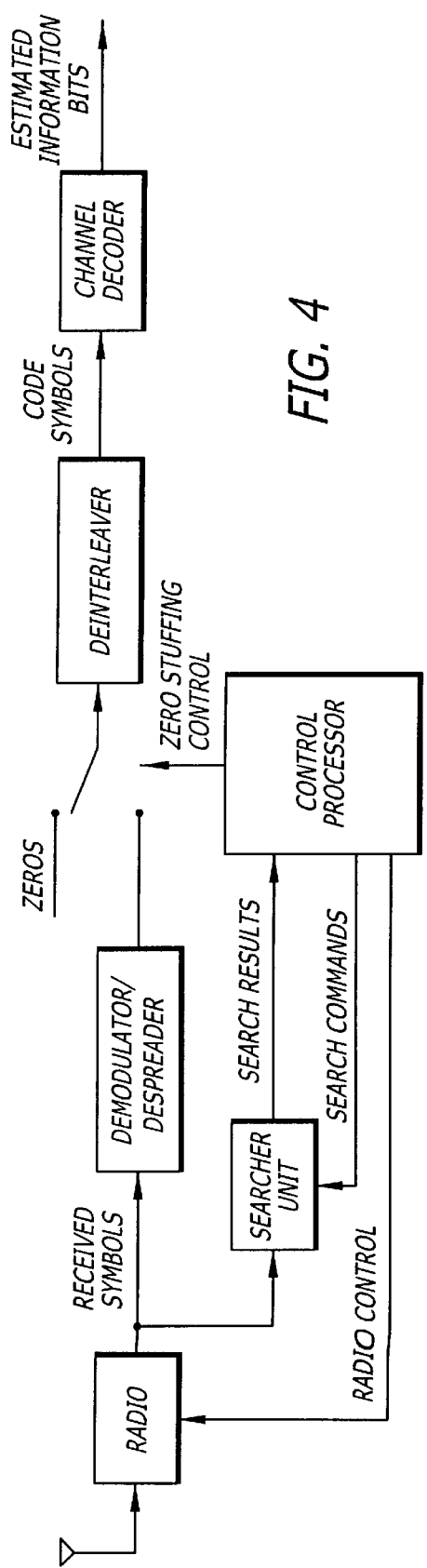
FIG. 4 is a block diagram of a receiver system embodying the present invention.

The timeline of the search procedure of the present invention is shown in FIG. 3. The method steps are as follows:

1. At some specified time near the end of the first search frame (frame 2 in FIG. 3), stop active demodulation and start inserting zero values for the symbol estimates to be input to the decoder.
2. Program the radio to the search frequency and wait for the radio to settle. This generally will include a PLL (Phase Locked Loop) settling time to the desired frequency and a receive gain control settling time to allow the receiver's variable gain amplifiers to adjust to the signal level on the new frequency.
3. Begin the search procedure for the alternative frequency.
4. Stop searching.
5. Program the radio and allow to settle.
6. As soon as the radio is settled, turn full demodulation on. Actual received signal values are now input to the decoder, rather than zeros. This returns the receiver to its usual state of full reception.

Following this procedure, the decoder can successfully demodulate the two frames on both sides of the search time. In the example shown in FIG. 3, both frames 2 and 3 could be successfully demodulated.

Each search period should be as small as possible to reduce performance degradation. If the channel has degradation from noise and fading, then erasure will effectively add to that degradation. The net effect can be approximated for sufficiently small search times as a loss of signal power. That is, if the erasure period is during N% of a given frame, that frame suffers an approximate signal power loss of (100-N)%. As an example, if the erasure is ¼ of a frame, then the signal power loss is approximately −10 log 10(¾)= 1.25 dB. This would allow for a total erasure period of ½ of a frame spread over two frames. In general, optimal reduction in performance degradation is achieved for symmetrical erasures in adjacent frames, that is, when the same number of zeros is inserted at the end of one frame as is inserted at the beginning of an adjacent next frame.

C. Applications of the Present Invention

To summarize, the present invention allows searching of frequencies other than the serving frequency without necessarily losing any data. This applies to systems where alternate frequencies must be searched but there are no free times provided to do so. Although there is an associated performance degradation, this degradation can be improved through reducing the search time required. Importantly, as compared to conventional methods which require a "hard" degradation from throwing away complete frames of data (i.e. information will certainly be lost), the present invention only results in "soft" degradation (effective loss of signal power without a certain loss of information).

By way of example but not of limitation, one possible application is a cellular phone embodying the present invention. Such a phone is capable of searching other frequencies for alternate base stations with minimal loss of received data. This effectively allows the phone to avoid nulled frames, with no or minimal loss of audio quality. However, the present invention could also be applied in any digital communications system which employs channel coding and interleaving.

In the cellular phone context, the present invention requires minimal alterations to existing cellular systems. Capability to insert zeros before decoding must be provided; however, the interleaver and decoder need not be modified. The transmitter is also unchanged.

The method of the present invention can be embodied in a system or an integrated circuit, which comprises a silicon base having a plurality of cells and associated interconnections fabricated thereon, and a package containing the silicon base; the package has a plurality of contacts which provide external output and input for the cells. In a preferred version, the cells include a demodulator which discontinues demodulation at a predetermined time before a frame ends, a deinterleaver which deinterleaves data received from the demodulator, and a channel decoder which decodes data received from the deinterleaver. There is also a control processor which directs zero values to be inserted into the frame after demodulation is discontinued, and a search unit which is directed to perform a search for alternative frequencies by the control processor, which continues to insert zero values into the frame and then a next frame. The control processor discontinues insertion of zero values after the search is completed, and then allows the demodulator to resume demodulation.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. Therefore, it is intended that all such variations not departing from the spirit of the invention be considered as within the scope thereof as limited solely by the claims appended hereto.

In the following claims, those elements which do not include the words "means for" are intended not to be interpreted under 35 U.S.C. § 112 ¶ 6.

What is claimed is:

1. A method for preventing information losses during alternative frequency searches by a receiving unit in a communication system, wherein data are channel coded, interleaved, and segmented into a plurality of frames, said method comprising the steps of:

demodulating during a frame;

discontinuing demodulation before the frame ends;

inserting zero values into the frame;

performing a search on an alternative frequency while continuing to insert zero values into the frame and then a next frame;

discontinuing insertion of zero values after the search is completed; and resuming demodulation.

2. The method of claim 1, wherein the receiving unit comprises a mobile radio station operating at a serving frequency.

3. The method of claim 2, wherein the step of inserting zero values is followed by a step of programming the mobile radio station to a search frequency and waiting for the mobile radio station to settle.

4. The method of claim 3, wherein the step of discontinuing insertion of zero values is preceded by a step of programming the mobile radio station to the serving frequency and waiting for the mobile radio station to settle.

5. A method according to claim 1, wherein demodulation is discontinued at a predetermined time before the frame ends.

6. A method according to claim 1, wherein approximately a same number of zeros is inserted at the end of the frame as is inserted at the beginning of the next frame.

7. A method for preventing information losses during alternative frequency searches by a mobile radio station operating at a serving frequency, wherein data are channel coded, interleaved, and segmented into a plurality of frames, said method comprising the steps of:

demodulating during a frame;

discontinuing demodulation before the frame ends;

programming the mobile radio station to a search frequency and waiting for the mobile radio station to settle;

inserting zero values into the frame;

performing a search on an alternative frequency while continuing to insert zero values into the frame and then a next frame;

programming the mobile radio station to the serving frequency and waiting for the mobile radio station to settles;

discontinuing insertion of zero values after the search is completed; and resuming demodulation.

8. A system for preventing information losses during alternative frequency searches by a receiving unit in a communication system, wherein data are channel coded, interleaved, and segmented into a plurality of frames, said system comprising:

a demodulator which demodulates during a frame and discontinues demodulation before the frame ends;

a deinterleaver which deinterleaves data received from the demodulator;

a channel decoder which decodes data received from the deinterleaver;

a control processor which directs zero values to be inserted into the frame after demodulation is discontinued; and a search unit which is directed to perform a search on an alternative frequency by the control processor, which continues to direct insertion of zero values into the frame and then a next frame during the search, wherein the control processor discontinues insertion of zero values after the search is completed, and then allows the demodulator to resume demodulation.

9. The system of claim 8, wherein the receiving unit comprises a mobile radio station operating at a serving frequency.

10. The system of claim 9, wherein the mobile radio station is programmed to a search frequency and allowed to settle after insertion of zero values begins.

11. The system of claim 10, wherein the mobile radio station is programmed to the serving frequency and allowed to settle before insertion of zero values is discontinued.

12. A system according to claim 8, wherein demodulation is discontinued at a predetermined time before the frame ends.

13. A system according to claim 8, wherein approximately a same number of zeros is inserted at the end of the frame as is inserted at the beginning of the next frame.

14. An integrated circuit for preventing information losses during alternative frequency searches by a receiving unit in a communication system, wherein data are channel coded, interleaved, and segmented into a plurality of frames, said integrated circuit comprising:

a silicon base having a plurality of cells and associated interconnections fabricated thereon;

a package containing the silicon base, wherein the package has a plurality of contacts which provide external output and input for the cells, wherein the cells include:

a demodulator which demodulates during a frame and discontinues demodulation before the frame ends;

a deinterleaver which deinterleaves data received from the demodulator;

a channel decoder which decodes data received from the deinterleaver;

a control processor which directs zero values to be inserted into the frame after demodulation is discontinued; and a search unit which is directed to perform a search on an alternative frequency by the control processor, which continues to direct insertion of zero values into the frame and then a next frame during the search, wherein the control processor discontinues insertion of zero values after the search is completed, and then allows the demodulator to resume demodulation.

15. The integrated circuit of claim 14, wherein the receiving unit comprises a mobile radio station operating at a serving frequency.

16. The integrated circuit of claim 15, wherein the mobile radio station is programmed to a search frequency and allowed to settle after insertion of zero values begins.

17. The integrated circuit of claim 16, wherein the mobile radio station is programmed to the serving frequency and allowed to settle before insertion of zero values is discontinued.

18. An apparatus for preventing information losses during alternative frequency searches by a receiving unit in a communication system, wherein data are channel coded, interleaved, and segmented into a plurality of frames, said apparatus comprising:

means for demodulating during a frame;

means for discontinuing demodulation before the frame ends;

means for inserting zero values into the frame;

means for performing a search on an alternative frequency while continuing to insert zero values into the frame and then a next frame;

means for discontinuing insertion of zero values after the search is completed; and means for resuming demodulation.

19. A computer-readable medium storing computer-executable process steps for preventing information losses during alternative frequency searches by a receiving unit in a communication system, wherein data are channel coded, interleaved, and segmented into a plurality of frames, said process steps comprising steps to:

demodulate during a frame;

discontinue demodulation before the frame ends;

insert zero values into the frame;

perform a search on an alternative frequency while continuing to insert zero values into the frame and then a next frame;

discontinue insertion of zero values after the search is completed; and resume demodulation.

* * * * *